United States Patent [19]

Lyon

[11] Patent Number: 5,813,768
[45] Date of Patent: Sep. 29, 1998

[54] SELF-ALIGNING BEARING STRUCTURE

[75] Inventor: Gregory S. Lyon, Mamaroneck, N.Y.

[73] Assignee: Thomson Industries, Inc., Port Washington, N.Y.

[21] Appl. No.: 857,575

[22] Filed: May 16, 1997

[51] Int. Cl.$^6$ .................................................. F16C 23/00
[52] U.S. Cl. ......................... 384/192; 384/275; 384/202
[58] Field of Search .................................. 384/192, 202, 384/215, 275, 295–300

[56] References Cited

U.S. PATENT DOCUMENTS

| | | |
|---|---|---|
| 2,675,283 | 4/1954 | Thomson . |
| 3,033,623 | 5/1962 | Thomson . |
| 3,372,960 | 3/1968 | Fisher .................................. 384/297 X |
| 3,604,765 | 9/1971 | Babrcock ................................ 384/192 |
| 3,859,885 | 1/1975 | Hayashida ........................... 384/300 X |
| 4,790,672 | 12/1988 | Komplin ............................. 384/296 X |
| 4,877,813 | 10/1989 | Jinno et al. .............................. 525/146 |
| 4,913,562 | 4/1990 | Rosen ...................................... 384/276 |
| 5,273,369 | 12/1993 | Strobl .................................. 384/275 X |
| 5,314,255 | 5/1994 | Schwerdt ................................ 384/536 |

FOREIGN PATENT DOCUMENTS 265296  3/1989  Germany ................................ 384/192

*Primary Examiner*—Thomas R. Hannon
*Attorney, Agent, or Firm*—Dilworth & Barrese

[57] ABSTRACT

A thermoplastic bearing liner having compliant and compensating structure to adjust for a misalignment of a shaft insertably received therein. The bearing liner comprises a hollow, substantially cylindrical shaped member having two ends and an intermediate portion. A flange extends circumferentially and projects radially from at least one of the two ends. A flexible frustoconical member is mounted adjacent a distal end of the flange and extends circumferentially from the flange.

14 Claims, 4 Drawing Sheets

SELF-ALIGNING BEARING STRUCTURE

BACKGROUND OF THE INVENTION

1. Field of the Invention

The present invention relates to bearings for linear, reciprocating and rotary shafts, and more specifically to a thermoplastic bearing liner having a compliant and compensating structure.

2. Description of the Related Art

A moving shaft supported by a bearing requires a low friction surface where the shaft contacts the bearing. The low friction surface may be attained, for example, by the application of a lubricant substance such as oil or grease, by employing a bearing liner constructed from low friction material, or by combining a lubricant, oil or grease with the use of a low friction bearing liner.

Bearing liners constructed from wear resistant low friction materials such as nylon, acetal, polycarbonate, or polytetrafluoroethylene are known in the art. For example, U.S. Pat. No. 2,675,283 to Thomson ('623) discloses a sleeve bearing comprising a layer of low friction material bonded to the inside of a metal support sleeve which is coiled into a cylindrical shape with its ends in close adjacency to each other.

Conventional bearing liners for linear, rotary and/or reciprocating shafts are typically molded single piece constructions of low friction plastic which are shaped as hollow cylinders. Bearing liners typically have a separation or gap extending from one end of the cylinder to the other. This separation or gap allows, inter alia, the bearing liner to be compressed into a smaller diameter so that it may be axially inserted into a housing bore.

In applications where the motion of the shaft exerts axial forces upon the bearing liner, especially with reciprocating shafts, the bearing liner must have a means for retaining it within the housing bore to prevent it from being ejected. Flanges have been employed for this purpose. In certain applications a bearing liner will have one or more flanges extending radially from the end or ends of the bearing. The flange or flanges may be external to the housing bore and overlap the edge of the bore to provide for retention of the bearing liner, or the flange may be received into an undercut in the inside surface of the housing bore where it is engaged when the bearing liner is inserted into the bore. Typical prior art bearing liner shapes are disclosed, for example, in U.S. Pat. No. 4,913,562 to Rosen.

Notwithstanding, problems sometimes arise in applications such as pneumatic and hydraulic linear actuators when the motion of the shaft is not in perfect alignment with the axis of the bearing. Pivoting motion in a linear or reciprocating shaft, or precession of a rotating shaft, will place great stress at the corner of the bearing liner where the flange is located. Thus, the amount of liner material actually in contact with the shaft is greatly reduced, often leading to increased friction, increased wear and decreased life expectancy. Liner flanges often break under the forces exerted by non-axial shaft motion.

Clearly, then, there is a need for an improved bearing liner that would extend the useful life of the liners made of the preferred low friction materials currently being used. An improved bearing liner will also increase the reliability of the machinery into which the liner is incorporated.

SUMMARY OF THE INVENTION

Accordingly, it is an object of the present invention to provide a bearing liner having end flanges configured to withstand greater degrees of shaft misalignment without failing.

It is a further objective of the present invention to provide a bearing liner of extended useful life formed of low friction materials as are known in the art.

It is yet a further objective of the present invention to provide a bearing liner which is configured to transfer a load, due to a misalignment in a shaft, which is normally concentrated on the corners of the liner, to a central portion of the liner. Thus, in effect, the disclosed bearing liner has compliant and compensating structure which is self-aligning to compensate for misalignments in a shaft and to maximize the surface contact area between the shaft and the bearing liner.

These and other objects, features and advantages of the present invention will become apparent from the following detailed description of illustrative embodiments, which is to be read in connection with the accompanying drawings.

BRIEF DESCRIPTION OF THE DRAWINGS

For a better understanding of the invention, reference is made to the following description of exemplary embodiments thereof, and to the accompanying drawings, wherein.

DETAILED DESCRIPTION OF A PREFERRED EMBODIMENT

Figure 1:
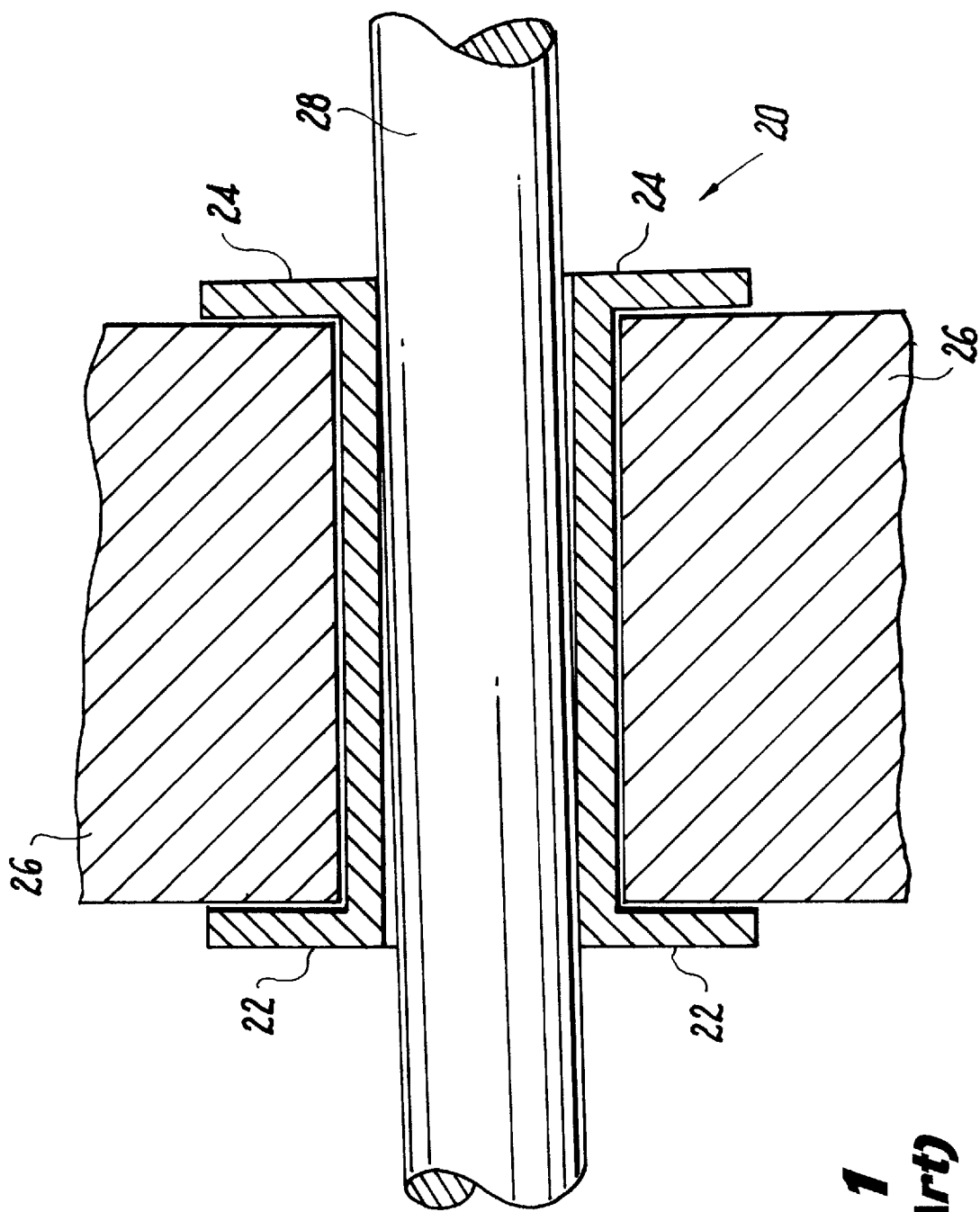
FIG. 1 is a cross-sectional side view of a bearing liner in accordance with the prior art.

Referring now to the drawings in detail, and initially to FIG. 1, there is shown a cross-sectional side view of a prior art type bearing liner 20 having radially extending flanges 22 and 24, one flange on each of the two ends of bearing liner 20. Flanges 22 and 24 overlap the edges of the housing bore to retain liner 20 in the housing 26.

FIG. 1 illustrates how non-axial shaft motion can damage the flanges 22 and 24 located at the ends of the prior art bearing liner 20, as described below. Although the deviation of the shaft 28 from axial alignment in bearing liner 20 is somewhat exaggerated in FIG. 1 for purposes of illustration, it can be readily seen that whether shaft 28 exhibits linear, reciprocating or rotary motion, any non-axial motion will place great stress on the bearing liner 20 at the point at which the shaft 28 contacts the corners formed by flanges 22 and 24 and the cylindrical portion of bearing 20. Since the prior art bearing liner 20 does not provide a means for realigning itself to compensate for a misalignment in shaft 28, the resulting stress is concentrated on the corners as described above. In many instances, the application of a substantial amount of stress on the corners where the flanges and cylindrically shaped members intersect will cause the flanges to break off.

Figure 2:
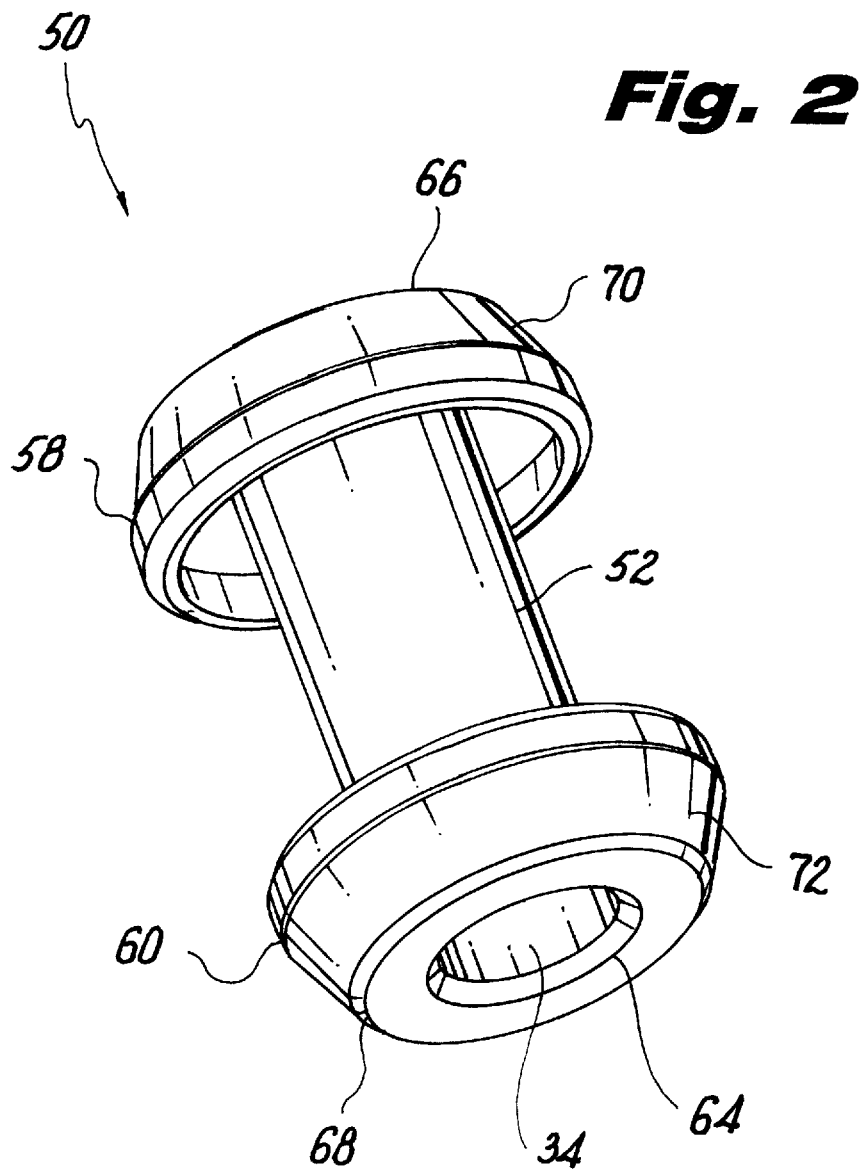
FIG. 2 is a perspective view of a bearing liner in accordance with the present invention.

Referring now to FIG. 2, there is shown a perspective view of a bearing liner 50 in accordance with the present invention. Bearing liner 50 is shown having a hollow cylindrical shaped member 52 for insertably receiving a shaft in bore 34. Bearing liner 50 further includes two end portions, each end portion having a flange 58 and 60 mounted thereon. Flanges 58 and 60 project radially from the end portions of cylindrical member 52. Each flange has a proximal end 62 and 64, respectively, mounted adjacent an end of cylindrical member 52 and a distal end 66 and 68, respectively. Flexible frustoconical members 70 and 72 extend circumferentially from the distal ends 66 and 68 of flanges 58 and 60 and project toward cylindrical member 52.

Figure 3:
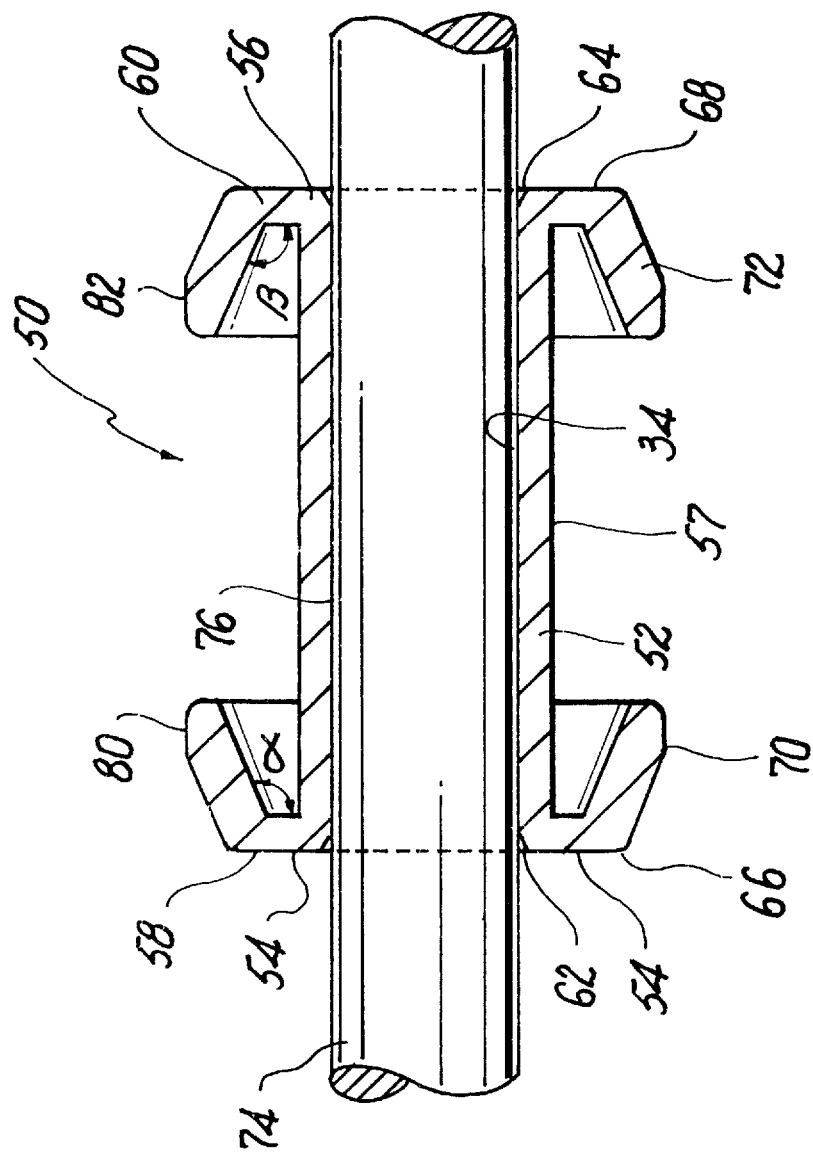
FIG. 3 is a cross-sectional side view of a bearing liner with a shaft inserted therein.

FIG. 3 illustrates a cross-sectional side view of bearing liner 50 in accordance with the present invention. Bearing liner 50 has a hollow, substantially cylindrical shaped member 52 having two ends 54 and 56 and an intermediate portion 57. Flanges 58 and 60 extend circumferentially and project outwardly from ends 54 and 56 of cylindrical member 52, respectively. Flanges 58 and 60 include proximal ends 62 and 64 mounted adjacent ends 54 and 56, and distal ends 66 and 68. Frustoconical members 70 and 72 extend circumferentially from distal ends 66 and 68 and project toward intermediate portion 57. Obtuse angles α and β are formed between frustoconical members 70 and 72 and flanges 58 and 60, respectively.

Bearing liner 50 is preferably constructed as a monolithic unit and is formed of a low friction polymeric material such as, e.g., nylon, acetal, polycarbonate and polytetrafluoroethylene. The selected material preferably provides flexibility in the bearing liner 50. It is also contemplated that the flanges 58 and 60 and frustoconical members 70 and 72 may be constructed independently of the substantially cylindrical shaped member 52, and then bonded by a fastening technique, such as ultrasonic welding. Furthermore, bearing liner 50 may be molded in two interlocking pieces (e.g., in a male/female configuration). Alternative manufacturing techniques are contemplated to reduce the complexity and cost of the manufacturing process, and to reduce the time required to install the bearing liner in the field.

Under optimal operating conditions, shaft 74 will be in perfect axial alignment with bearing liner 50 such that the shaft 74 contacts the inside surface area 76 of bore 34 uniformly. Load transmitted by shaft 74 will therefore be transmitted uniformly across the inside surface area 76. The load is then transmitted through the flanges 58 and 60 to frustoconical members 70 and 72. Since the distal ends 80 and 82 of frustoconical members 70 and 72 are typically restrained within a bore of a section of machinery or a pillow block assembly, a bending moment is developed across the frustoconical members 70 and 72 and flanges 58 and 60. The bending moment will cause the magnitude of angles α and β to be decreased. Advantageously, the bending moment will cause the intermediate portion 57 of bearing liner 50 to flex inwardly, toward shaft 74, thereby forcing a more uniform contact along inside surface area 76 at the intermediate portion 57 rather than concentrating the force on the corners. Thus, the highly stressed end contact points are eliminated as a function of the applied load.

Figure 4:
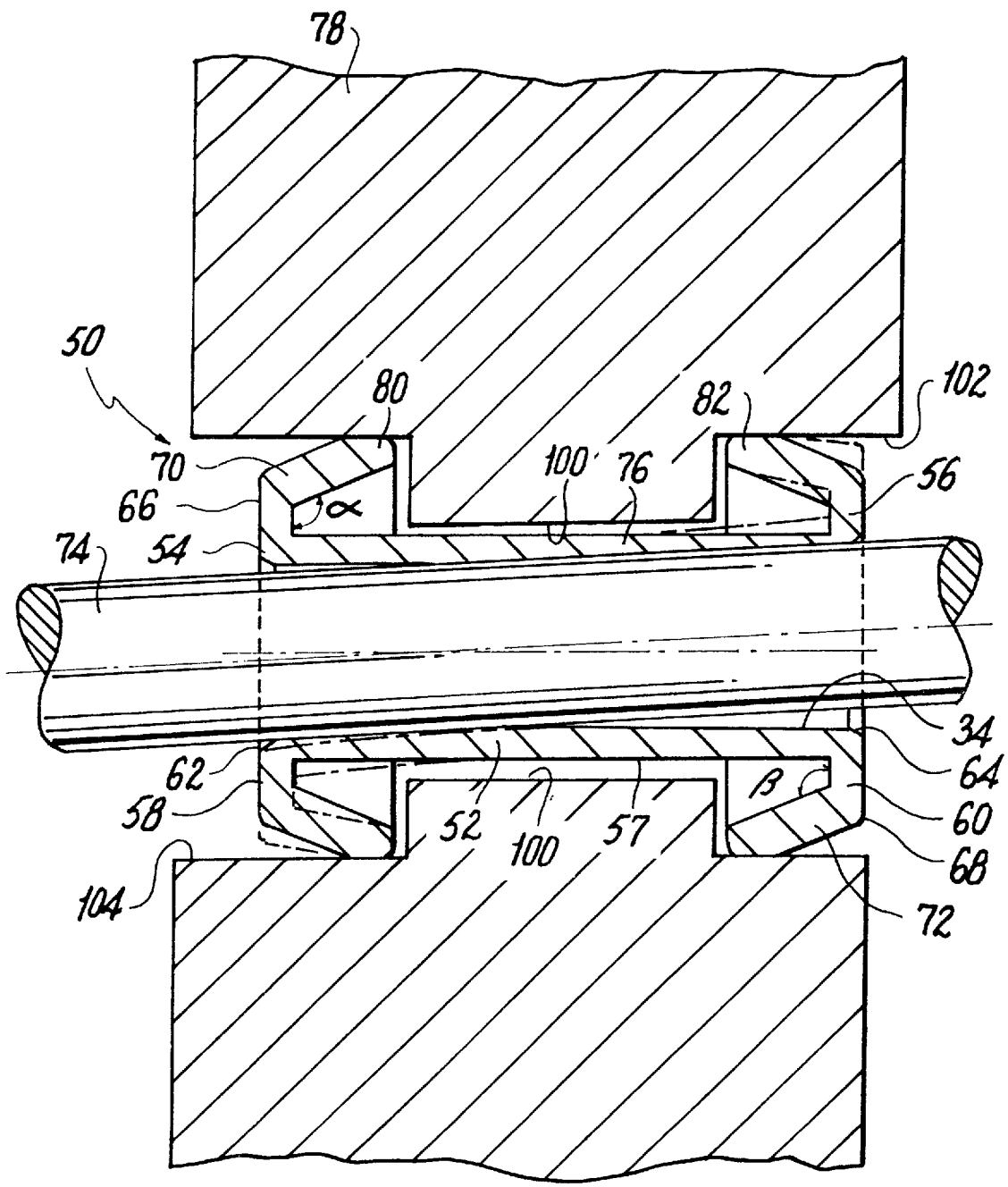
FIG. 4 is a cross-sectional side view of a bearing liner with a misaligned shaft therein.

FIG. 4 illustrates bearing liner 50 of the present invention mounted within a bore 100 of a section of machinery, housing or a pillow block assembly 78 as is known in the art. Housing bore 100 includes a first aperture 102 and a second aperture 104 through which a shaft 74 passes. Each aperture 102 and 104 has a diameter greater than the diameter of the bore 100. In an assembled condition, the frustoconical members 70 and 72 of the bearing liner 50 are positioned within respective apertures 102 and 104 of housing bore 100. For purposes of illustration, shaft 74 is shown in an exaggerated axial misalignment in bearing liner 50. As seen in the prior art bearing liners (refer to FIG. 1), an axial misalignment will result in a stress concentrated on the corners formed by flanges 22 and 24 and the cylindrical portion of bearing liner 20. Such a concentrated stress often leads to a rapid failure of the bearing liner.

In accordance with the present invention, as illustrated in FIG. 4, the additional load applied to the bearing liner 50 due to axial misalignment is transferred from the shaft to the internal surface area 76 of bore 34, through flanges 58 and 60 to frustoconical members 70 and 72. As shown, the distal ends 80 and 82 of frustoconical members 70 and 72 are typically restrained within a bore of a section of machinery or a pillow block assembly 78. Therefore, as shown by the dashed lines, frustoconical members 70 and 72 are forced inward thereby decreasing angles α and β and advantageously create a bending moment about flanges 58 and 60. In contrast to the prior art bearing liner as shown in FIG. 1, the stress due to misalignment in the bearing liner of the present invention is not concentrated on the corners formed by flanges 58 and 60 and cylindrical shaped member 52. The bending moment created by the new configuration of frustoconical members 70 and 72 vis-a-vis flanges 58 and 60 causes a flexure of bearing liner 50 whereby intermediate portion 57 is flexed toward shaft 74 and ends 54 and 56 are urged away from shaft 74 in the direction of misalignment. Therefore, the objective of this invention is accomplished, i.e., a bearing liner is provided which is configured to transfer a load, due to a misalignment in a shaft, which is typically concentrated on the corners of the liner, to a central portion of the bearing liner. Thus, the uniform load distribution will extend the useful life of the bearing liner.

Although the illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A bearing liner comprising:
   a hollow, substantially cylindrical shaped member having two ends and an intermediate portion;
   a flange extending circumferentially and projecting radially from each of said two ends, each flange having a proximal end and a distal end; and
   a flexible frustoconical member mounted adjacent said distal end of each of said flanges, said frustoconical member extending circumferentially and projecting outwardly from said flange.

2. A bearing liner as recited in claim 1, wherein said bearing liner is resilient.

3. A bearing liner as recited in claim 1, wherein the bearing liner is constructed as a monolithic unit.

4. A bearing liner as recited in claim 1, wherein the bearing is formed of low friction material.

5. A bearing liner as recited in claim 4, wherein the low friction material is a polymeric material.

6. A bearing liner as recited in claim 5, wherein the polymeric material is selected from the group consisting of nylon, acetal, polycarbonate and polytetrafluoroethylene.

7. A bearing liner as recited in claim 1, wherein an angle formed between said external rib and said finger member is in the range of 90° to 180°.

8. A bearing liner as recited in claim 1, wherein said finger member projects from said distal end of said external rib toward the intermediate portion of said substantially cylindrical shaped member.

9. A housing and bearing assembly comprising:
   a housing including a throughbore having a central portion and an aperture formed at each end thereof, each aperture having a diameter greater than the diameter of the central portion; and a cylindrical bearing having first and second ends positioned within the throughbore, each end of the bearing including a radially extending flange and a flexible frustoconical member extending from a distal end of each of the flanges, each flexible frustoconical member being positioned within a respective aperture of the housing.

10. A housing and bearing assembly according to claim 9, wherein the bearing is of monolithic construction.

11. A housing and bearing assembly according to claim 9, wherein the bearing is formed of low friction material.

12. A housing and bearing assembly according to claim 11, wherein the low friction material is a polymeric material.

13. A housing and bearing assembly according to claim 12, wherein the polymeric material is selected form the group consisting of nylon, acetal, polycarbonate, and polytetrafluoroethylene.

14. A housing and bearing assembly according to claim 9, wherein each flexible frustoconical member is slidably positioned against a wall of a respective one of the apertures.

* * * * *